(12) United States Patent
Ball

(10) Patent No.: US 10,710,678 B2
(45) Date of Patent: Jul. 14, 2020

(54) SNOW BIKE TRACK ASSEMBLY

(71) Applicant: Jaron L. Ball, Harrisville, UT (US)

(72) Inventor: Jaron L. Ball, Harrisville, UT (US)

( * ) Notice: Subject to any disclaimer, the term of this patent is extended or adjusted under 35 U.S.C. 154(b) by 169 days.

(21) Appl. No.: 15/788,050

(22) Filed: Oct. 19, 2017

(65) Prior Publication Data

US 2018/0111662 A1 Apr. 26, 2018

Related U.S. Application Data

(60) Provisional application No. 62/410,921, filed on Oct. 21, 2016.

(51) Int. Cl.
| | | |
|---|---|---|
| *B62D 55/108* | (2006.01) | |
| *B62M 27/02* | (2006.01) | |
| *B62L 1/00* | (2006.01) | |
| *B62D 55/10* | (2006.01) | |
| *B62D 55/104* | (2006.01) | |
| *B62D 55/07* | (2006.01) | |

(52) U.S. Cl.
CPC ............. *B62M 27/02* (2013.01); *B62D 55/07* (2013.01); *B62D 55/10* (2013.01); *B62D 55/104* (2013.01); *B62D 55/108* (2013.01); *B62L 1/00* (2013.01); *B62M 2027/021* (2013.01); *B62M 2027/022* (2013.01); *B62M 2027/026* (2013.01); *B62M 2027/027* (2013.01)

(58) Field of Classification Search
CPC ............ B62M 27/02; B62M 2027/021; B62M 2027/022; B62M 2027/026; B62M 2027/027; B62D 55/07; B62D 55/10; B62D 55/104; B62D 55/108
See application file for complete search history.

(56) References Cited

U.S. PATENT DOCUMENTS

| | | | |
|---|---|---|---|
| 3,412,821 A | | 11/1968 | Humphrey |
| 3,822,755 A | | 7/1974 | Hine |
| 4,502,560 A | * | 3/1985 | Hisatomi ............... B62M 27/02 180/190 |
| 5,667,031 A | * | 9/1997 | Karpik ................... B62M 27/02 180/190 |
| 6,234,264 B1 | * | 5/2001 | Boivin ................... B62M 27/02 180/193 |
| 7,182,165 B1 | | 2/2007 | Keinath et al. |
| 7,357,201 B2 | | 4/2008 | Jordan |
| 8,910,738 B2 | | 12/2014 | Mangum |
| 9,346,518 B2 | * | 5/2016 | Polakowski ........... B62M 27/02 |

(Continued)

*Primary Examiner* — Anne Marie M Boehler
(74) *Attorney, Agent, or Firm* — Holland & Hart LLP

(57) ABSTRACT

A snow bike track assembly includes a frame assembly, at least one strut, an endless track, a plurality of top and bottom rollers, a skid rail assembly, a drive assembly, and a swing arm assembly. The frame assembly is configured to connect to a frame of a motorcycle in place of a rear wheel of the motorcycle. The at least one strut is connected to the frame assembly and configured to connect to the motorcycle frame in place of a rear shock of the motorcycle. The plurality of top rollers are mounted to the frame assembly and arranged to support the endless track. The plurality of lower rollers are mounted to the skid rail assembly and arranged to support the endless track. The drive assembly is configured to drive the endless track. The swing arm assembly is coupled between the frame assembly and the skid rail assembly.

12 Claims, 16 Drawing Sheets

(56) References Cited

U.S. PATENT DOCUMENTS

| | | | |
|---|---|---|---|
| RE47,113 E * | 11/2018 | Mallette | B62D 55/104 |
| 2012/0222908 A1 * | 9/2012 | Mangum | B62D 55/04 |
| | | | 180/193 |
| 2015/0144412 A1 | 5/2015 | Mangum | |

* cited by examiner

SNOW BIKE TRACK ASSEMBLY

RELATED APPLICATIONS

This application claims the benefit of the filing date of U.S. Provisional Application No. 62/410,921, filed on 21 Oct. 2016, and entitled SNOW BIKE TRACK ASSEMBLY, the disclosure of which is incorporated, in its entirety by this reference.

TECHNICAL BACKGROUND

The present disclosure generally relates to snow bikes, and particularly relates to endless track devices that can be used in place of a rear wheel of a motorcycle to provide a drive system for a snow bike.

BACKGROUND

Kits for converting ordinary dirt bikes and light motorcycles for winter use as snow bikes are becoming more popular. Some kits make it possible to reversibly mount a ski and drive track to the motorcycle for use in snow conditions and convert back to the original wheels for other uses. Kits for converting motorcycles into a track driven snow vehicle (e.g., snow bike) may make use of offroad vehicles that may otherwise lay idle during winter conditions. Once converted, a motorcycle with at least the track portion in place of the rear wheel may be operated on mud, sand, or snow, (i.e., all terrain) and then converted back for use as a motorcycle. A snow bike may be powered by the original vehicle drive system and use at least some of the original braking and suspension systems.

Some snow bikes lack performance and agility for snow conditions, especially on diagonal or steep slopes. This lack of performance and agility is due in part to the need for a secure mounting of the track assembly to the rear of the motorcycle to provide control and stability, which may result in reduced shock absorption, agility, performance and maneuverability when the track assembly is mounted.

Opportunities exist for improvements in track assemblies for use with snow bikes.

SUMMARY

According to one aspect of the present disclosure, a snow bike track assembly includes a frame assembly, at least one strut, an endless track, a plurality of top and bottom rollers, a skid rail assembly, a drive assembly, and a swing arm assembly. The frame assembly is configured to connect to a frame of a motorcycle in place of a rear wheel of the motorcycle. The strut is connected to the frame assembly and configured to connect to the motorcycle frame in place of a rear shock of the motorcycle. The plurality of top rollers are mounted to the frame assembly and arranged to support the endless track. The plurality of lower rollers are mounted to the skid rail assembly and arranged to support the endless track. The drive assembly is configured to drive the endless track, is mounted to the frame assembly and is configured to be driven by an engine of the motorcycle. The swing arm assembly is coupled between the frame assembly and the skid rail assembly.

The swing arm assembly may include a swing arm member connected to the frame assembly, a connector connected to the skid rail assembly, and a dampening member interposed between the swing arm member and the connector and operable to dampen relative rotation between the swing arm member and the connector. In other embodiments, the swing arm assembly comprises a solid assembly without the option for relative rotation between the swing arm member and the connector. In this alternative embodiment, a relationship between the swing arm and the rear strut and/or rear shock provides a similar function as the relative rotation provided in other types of swing arm assemblies.

In one embodiment, the at least one strut includes a first strut connected between the frame assembly and the motorcycle frame, and a second strut connected between the skid rail assembly and the tunnel.

The swing arm member may be pivotally connected to the frame assembly. The connector may be pivotally connected to the skid rail assembly. The swing arm member may include first and second arm portions that are laterally spaced apart from each other. The frame assembly may include a subframe assembly and a tunnel assembly, the subframe assembly being configured to connect to the motorcycle frame, the plurality of top rollers being mounted to the subframe assembly, and the swing arm member being connected to the tunnel assembly. The drive assembly may include a drive shaft and at least one drive member mounted to the drive shaft, and the at least one drive member may be arranged in contact with and configured to move the endless track.

The snow bike track assembly may also include a brake member mounted to the drive shaft and operable to stop rotation of the endless track. The snow bike track assembly may further include a shock strut interposed between the skid rail assembly and the frame assembly, the shock strut being positioned rearward of the swing arm assembly. The dampening member, if provided in the track assembly, may be adjustable or replaceable to vary an amount of dampening applied by the dampening member between the swing arm member and connector. The strut may include at least one shock absorbing member. The drive assembly may include an idler pulley, and the idler pulley may have an eccentric mounting structure.

Another aspect of the present disclosure relates to a snow bike track assembly that includes a frame assembly, a strut, an endless track, and a drive assembly configured to drive the endless track. The frame assembly is configured to connect to a frame of a motorcycle in place of a rear wheel of the motorcycle. The strut includes a cylinder, a piston, a first dampening member, and a spring. The cylinder has a cavity and a first connection member. The cavity includes a closed end and an open end, and the first connection member is configured to connect the strut to the motorcycle frame in place of a rear shock of the motorcycle. The piston has a piston head at a first end thereof and a second connection member at a second end thereof. The piston head is insertable into the cavity, and the second connection member is connected to the frame assembly. The first dampening member is positioned between the piston head and the closed end of the cavity. The spring is positioned between the piston head and the second connection member. The spring and first dampening member are operable to dampen axial forces applied to the strut during operation of the snow bike track assembly.

The strut may include a second dampening member mounted to the piston between the spring and the piston head. The first and second dampening members may have at least one of different shapes, different sizes, and different dampening characteristics. The first and second dampening members may each have a toroid-shaped construction. The first and second dampening members may comprise a dampening material such as rubber. In other embodiments, the dampening material may include a liquid such as oil or a gas.

A further aspect of the present disclosure relates to a snow bike track assembly that includes a frame assembly configured to connect to a frame of a motorcycle in place of a rear wheel of the motorcycle, a drive assembly configured to drive an endless track, and a brake member mounted to the drive shaft and operable to stop rotation of the drive shaft. The drive assembly includes a drive shaft and a drive member mounted to the drive shaft. The drive member is arranged in contact with and configured to move the endless track.

The snow bike track assembly may also include an upper drive shaft, a first pulley or sprocket mounted to the drive shaft, a second pulley or sprocket mounted to the upper drive shaft, and an upper shaft drive belt coupled between the first and second pulleys or sprockets. The brake member may include a brake disk. The brake caliper may include at least and at least first and second sets of brake pads operating on the brake disk. The first and second sets of brake pads may be independently operable. The brake member may further include a brake caliper mounted to the frame assembly and operable to apply a resistance force to the brake disk. The brake member may be positioned within the endless track. The drive assembly may also include a drive sprocket or pulley mounted to the drive shaft and configured to connect with a drive chain or belt of the motorcycle.

In other embodiments, a snow bike assembly may include a motorcycle, a track assembly mounted to the motorcycle in place of a rear wheel, and a front ski assembly mounted to the motorcycle in place of a front wheel. The front ski assembly may include a front ski, a front ski mount and/or a front ski spindle assembly.

A further aspect of the present disclosure is directed to a snow bike track assembly that includes a frame assembly configured to connect to a frame of a motorcycle in place of a rear wheel of the motorcycle, an endless track, a plurality of top rollers mounted to the frame assembly and arranged to support the endless track, a skid rail assembly, and a plurality of lower rollers mounted to the skid rail assembly and arranged to support the endless track. The snow bike track assembly further includes at least one stop member mounted to the skid rail assembly and configured to limit maximum rotational movement of the skid rail assembly toward the frame assembly.

The snow bike track assembly may include at least one strut connected to the frame assembly and configured to connect to the motorcycle frame in place of a rear shock of the motorcycle. The at least one stop member may be integrally formed with the skid rail assembly. The snow bike track assembly may include an upper shaft mounted to the frame assembly and configured to support the plurality of top rollers. The at least one stop member may be configured to contact the upper shaft to limit a maximum rotated position for the skid rail assembly relative to the frame assembly.

The above summary is not intended to describe each embodiment or every implementation of embodiments of the present disclosure. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
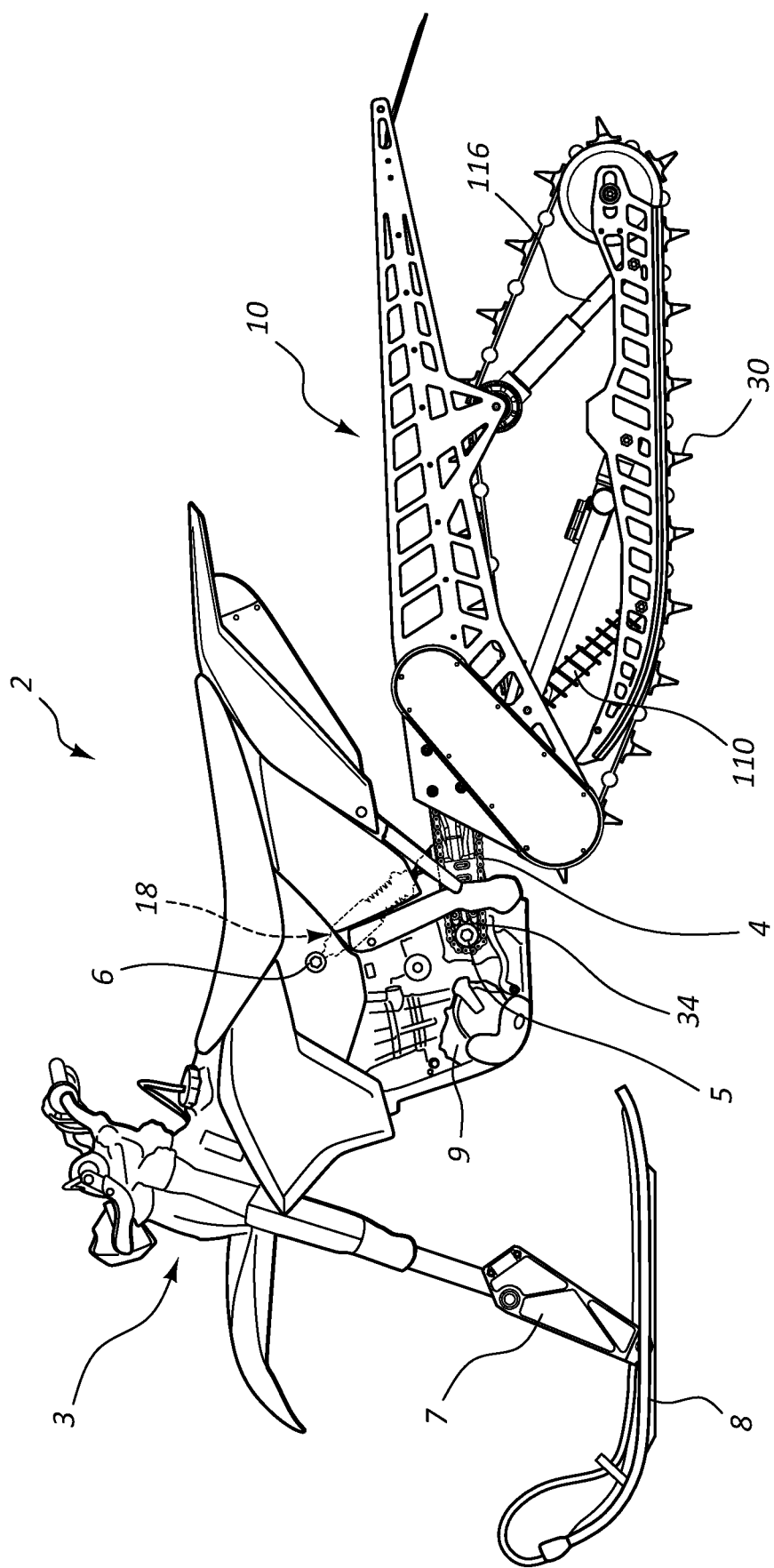
FIG. 1 is a side view of a snow bike having a front ski and rear track assembly in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to snow bikes and snow bike kits. In one embodiment, a snow bike kit includes a track assembly that is intended to be mounted to a motorcycle in place of the rear wheel of the motorcycle. The snow bike kit may also include a front ski assembly that is mounted to the motorcycle in place of the front wheel of the motorcycle. The front ski assembly may be referred to as a front ski spindle assembly or include a front ski spindle assembly.

The track assembly may include a number of features and functions that are an improvement on existing snow bikes and snow bike kits. For example, the track assembly may include a swing arm assembly that provides for improved tilting and maneuverability for the snow bike. The swing arm assembly may include a dampening member. The dampening member may be adjustable to provide varying amounts of dampening in a side-to-side direction. The track assembly may also include at least one connecting strut that extends between the frame of the motorcycle and a subframe of the track assembly. In some embodiments, the track assembly may include multiple struts to provide additional support and/or rigidity in the track assembly. The strut may include shock absorbing features. In some embodiments, the strut may include a plurality of shock absorbing features that provide customized amounts and/or types of dampening.

The track assembly may include a brake assembly that operates directly on a drive shaft of the track assembly. In one example, the brake assembly includes a brake disk. The brake disc may be mounted directly to a driveshaft of the track assembly that drives the endless track. The track assembly may also include a secondary drive assembly that includes a plurality of pulleys, including an idler pulley. The idler pulley may be mounted to the subframe or tunnel structure of the track assembly. The idler pulley may include an eccentric mounting structure. The eccentric mounting structure may provide advantages including, for example, ease of adjusting the idler pulley into various positions to adjust tension in the belt or chain that extends around the pulleys of the secondary drive assembly.

Referring to FIG. 1, an example snow bike 2 is shown and described. The snow bike 2 includes a motorcycle 3 having its front wheel and rear wheel removed. The motorcycle 3 includes a drive chain 4, a rear axle mount 5, and a rear strut mount 6 that are used to secure a track assembly 10 to the motorcycle in place of the rear wheel. The chain 4 is coupled to a drive sprocket of the track assembly (not shown in FIG. 1). Operating the engine 9 of the motorcycle 3 drives the chain 4 thereby rotating an endless track 30 of the track assembly 10. A front ski mount or spindle 7 is connected in place of the front wheel. A front ski 8 is mounted to the front ski mount 7.

While the track assembly 10, front ski mount 7 and front ski 8 are primarily intended as a retrofit kit to reversibly convert the motorcycle 3 into snow bike 2, it may be possible to permanently mount the track assembly 10, front ski mount 7 and front ski 8 to the motorcycle 3 in place of the motorcycle wheels, or even create the snow bike 2 in its original form with the track assembly 10, front ski mount 7 and front ski 8 being used in place of wheels.

Figure 2:
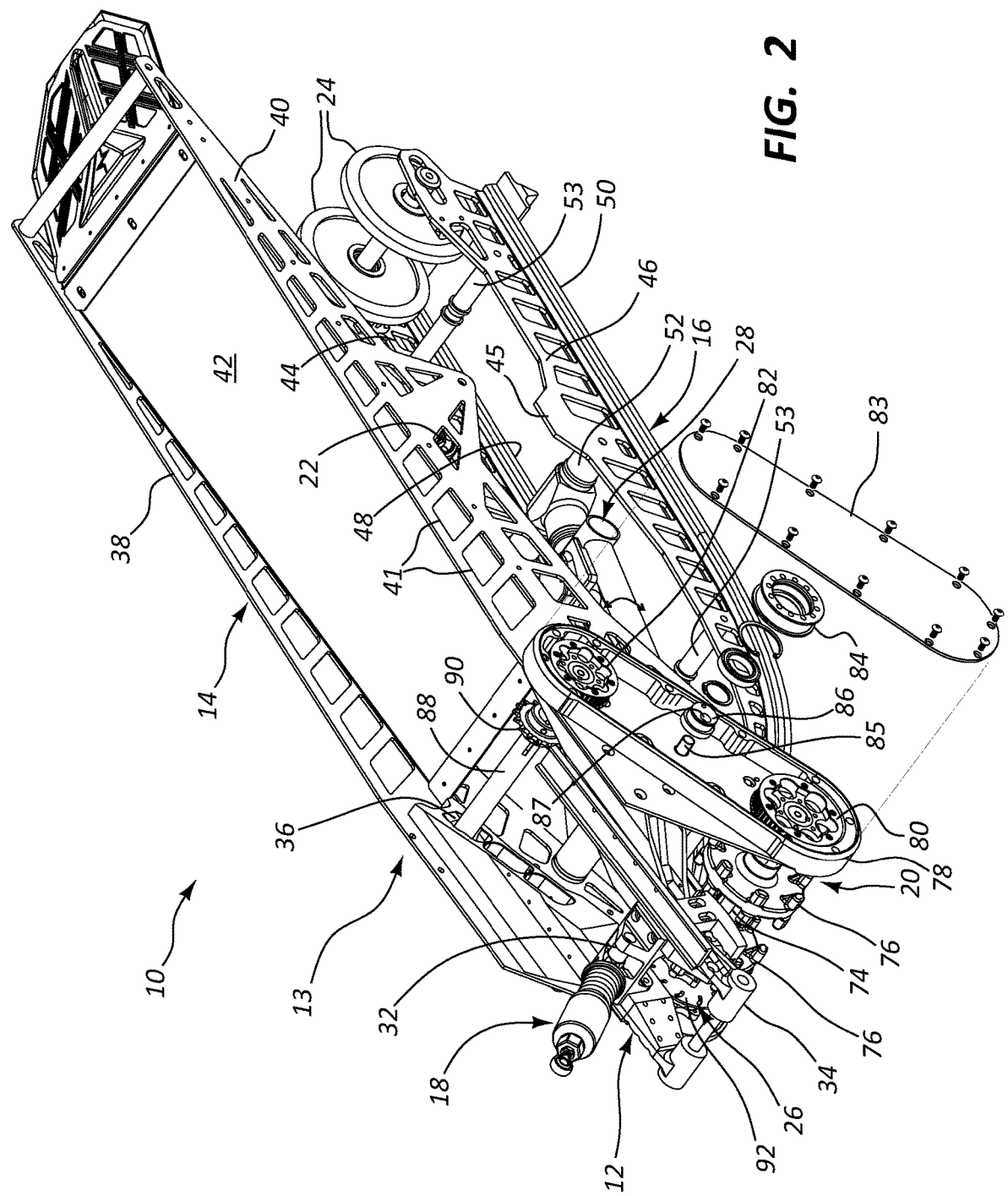
FIG. 2 is a top perspective view of the track assembly shown in FIG. 1.

The track assembly 10 is shown and described in further detail with reference to FIGS. 2-16, and particularly FIGS. 2 and 3. The track assembly 10 includes a subframe 12 and tunnel 14 that are part of a frame assembly 13. The subframe 12 is intended primarily for attachment of the track assembly 10 to the motorcycle 3. The subframe 12 couples the motorcycle 3 to the tunnel 14.

The track assembly 10 also includes a skid rail assembly 16, a shock strut 18 (also referred to as a strut or a shock), a drive assembly 20, upper and lower rollers 22, 24, a brake assembly 26, and a swing arm assembly 28. The track assembly 10 also includes the endless track 30, at least one shock 110 (also referred to as a strut or shock strut), and shock strut 116 (also referred to as a strut or shock), shown in FIG. 1. The skid rail assembly 16 is mounted to the tunnel 14 via the swing arm assembly 28, shock 110, and shock strut 116. The shock strut 18 is connected to the subframe 12 at one end and to the motorcycle 3 at its opposite end.

The drive assembly 20 is mounted to the tunnel 14. The upper rollers 22 are mounted to the tunnel 14. The lower rollers 24 are mounted to the skid rail assembly 16. The brake assembly 26 may be mounted to a portion of the drive assembly 20 such as, for example, a drive shaft, as will be described in further detail below. The swing arm assembly 28 is coupled between the tunnel 14 and skid rail assembly 16. The endless track 30 extends along a bottom side of the skid rail assembly 16, around the upper and lower rollers 22, 24, and around portions of the drive assembly 20.

The subframe 12 includes a strut mount 32, an axle mount 34, and an upper drive mount 36. The shock strut 18 is connected to the strut mount 32. The axle mount 34 is configured to be connected to the rear axle mount 5 of the motorcycle 3 (see FIG. 1). The upper drive mount 36 supports an upper drive shaft 88 of the drive assembly 20, as will be described in further detail below. The subframe 12 may include a plurality of frame and support members that are interconnected using, for example, welding, fasteners, and the like. The subframe 12 is connected to the tunnel 14 at a front end portion of the tunnel 14.

The tunnel 14 includes first and second side plates 38, 40 and a top plate 42. The first and second side plates 38, 40 may be connected to various other components of the track assembly 10 including, for example, the subframe 12, portions of the drive assembly 20, the upper rollers 22, the brake assembly 26, the swing arm assembly 28, and shock struts 110, 116. The top plate 42 extends between the first and second side plates 38, 40 and may provide a support surface for storing items such as, for example, replacement parts, outerwear, fuel containers, tools, and the like. The first and second side plates 38, 40 may include apertures 41 along the length thereof. The apertures 41 may provide connecting locations for securing the gear on the top plate 42 using, for example, straps, netting, cords, and the like.

The skid rail assembly 16 includes a bump stop 45 (also referred to as a stop member), first and second skid rails 44, 46, first and second sliders 48, 50, and a swing arm mount axle 52. The first and second sliders 48, 50 are mounted to bottom surfaces of the first and second skid rails 44, 46, respectively. The first and second sliders 48, 50 define a surface along which the endless track 30 moves as the track is driven by the drive assembly 20. The swing arm mount axle 52 is connected between the first and second skid rails 44, 46. The skid rail assembly 16 may include a shock mount 53 that extend between the first and second skid rails 44, 46 to provide support for the shock struts 110, 116. The shock struts 110, 116 individually or in combination, may provide some lateral stability for the track assembly 10, and particularly for the skid rail assembly 16 relative to the tunnel 14.

Figure 3:
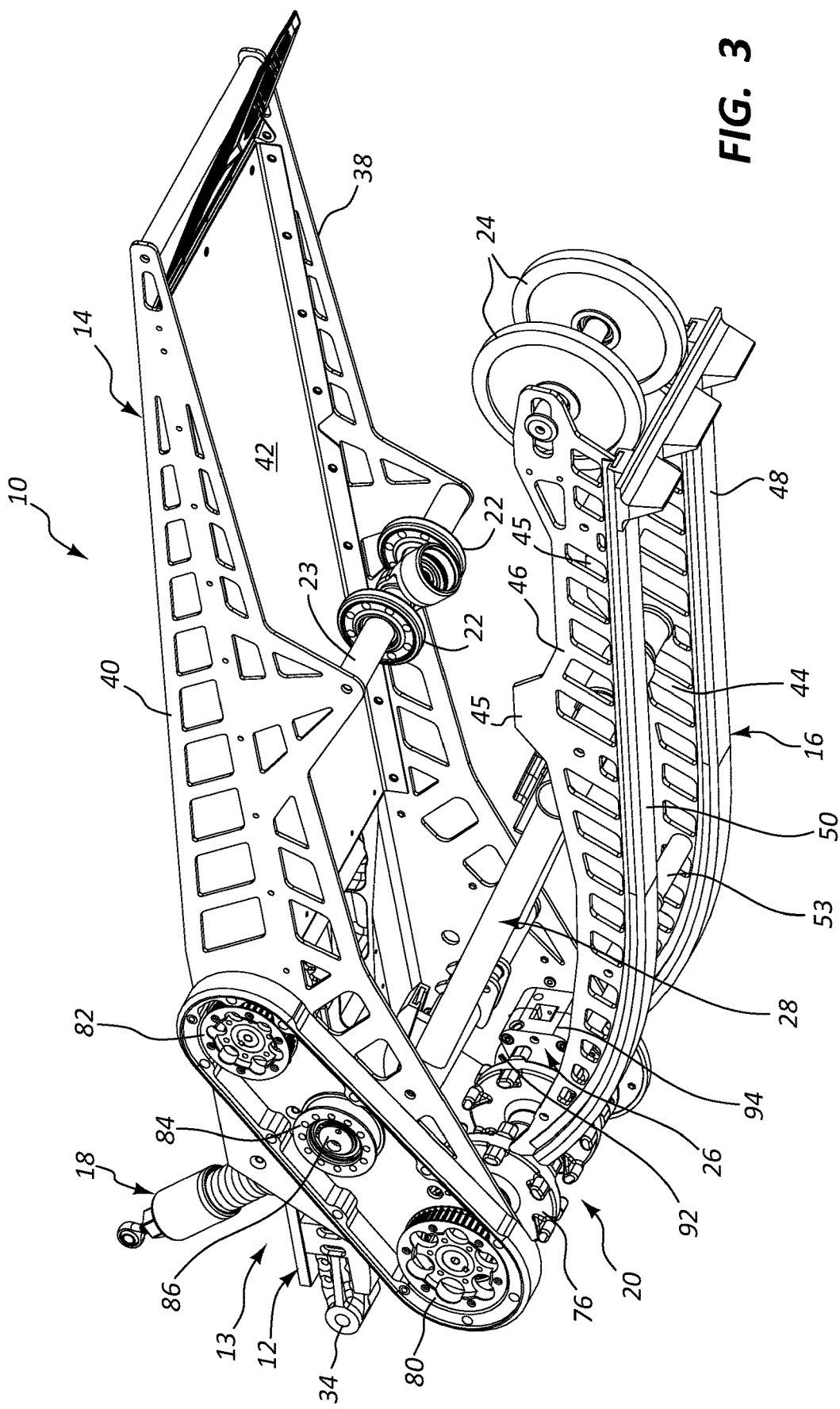
FIG. 3 is a bottom perspective view of the track assembly shown in FIG. 1.
Figure 4:
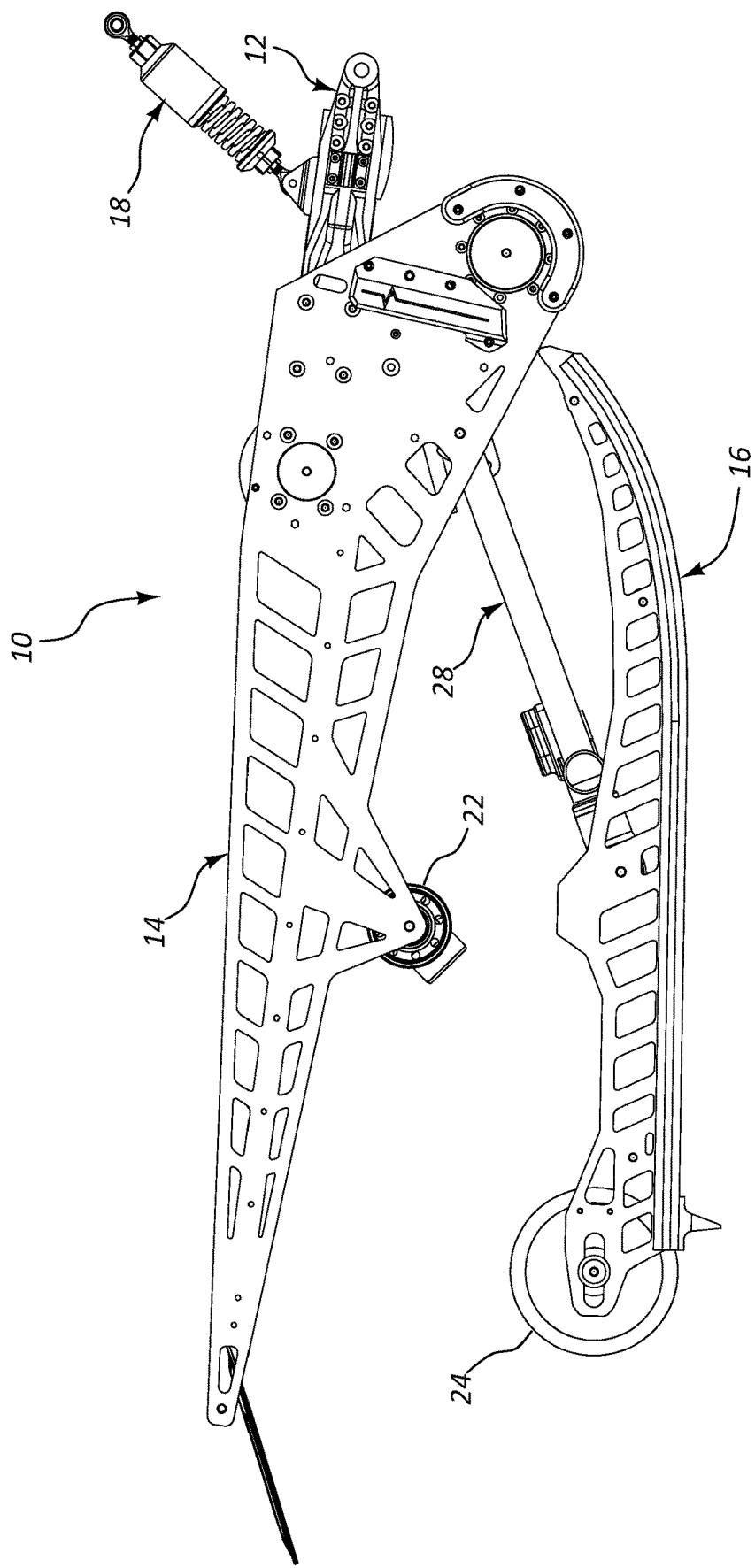
FIG. 4 is a right side view of the track assembly shown in FIG. 1.
Figure 5:
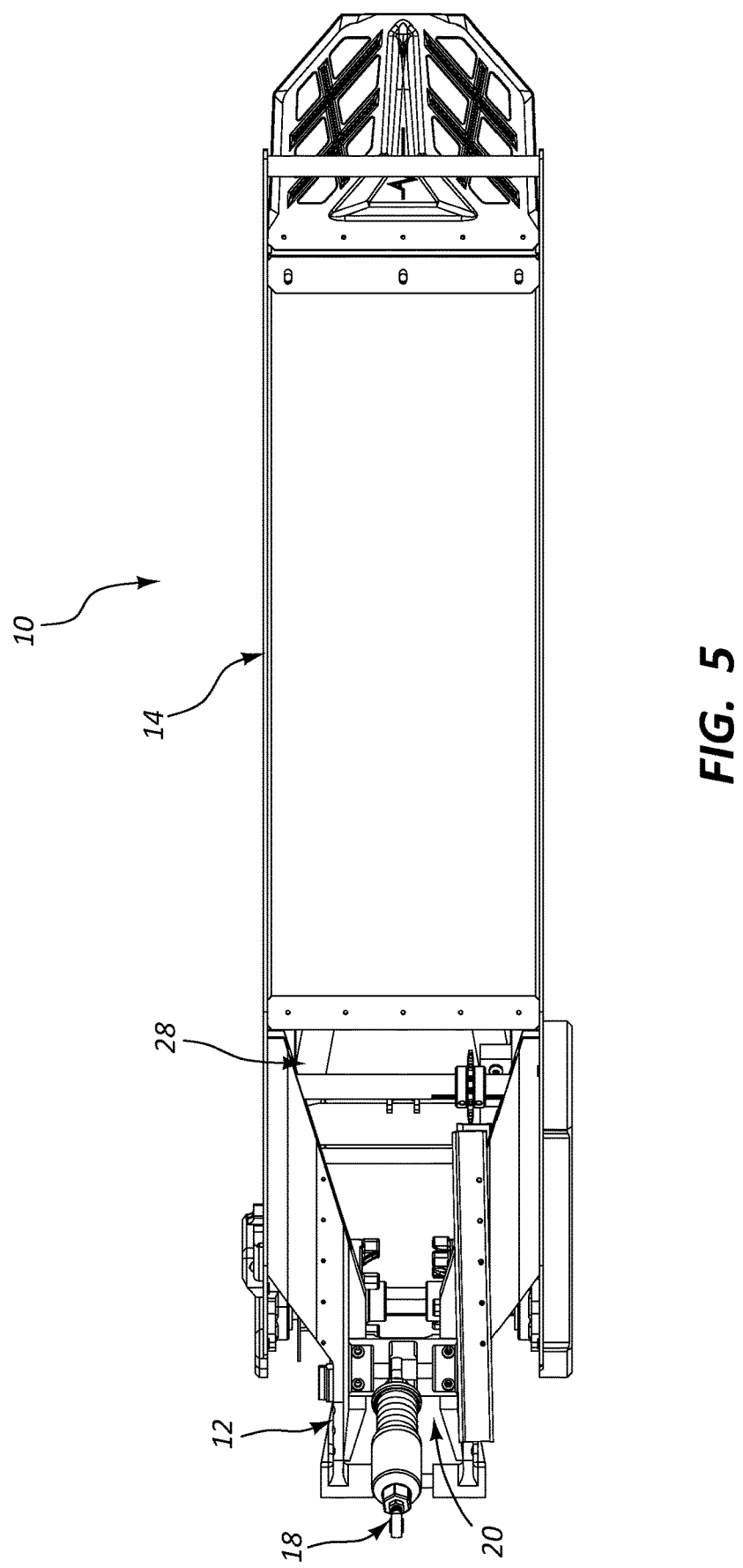
FIG. 5 is a top view of the track assembly shown in FIG. 1.
Figure 6:
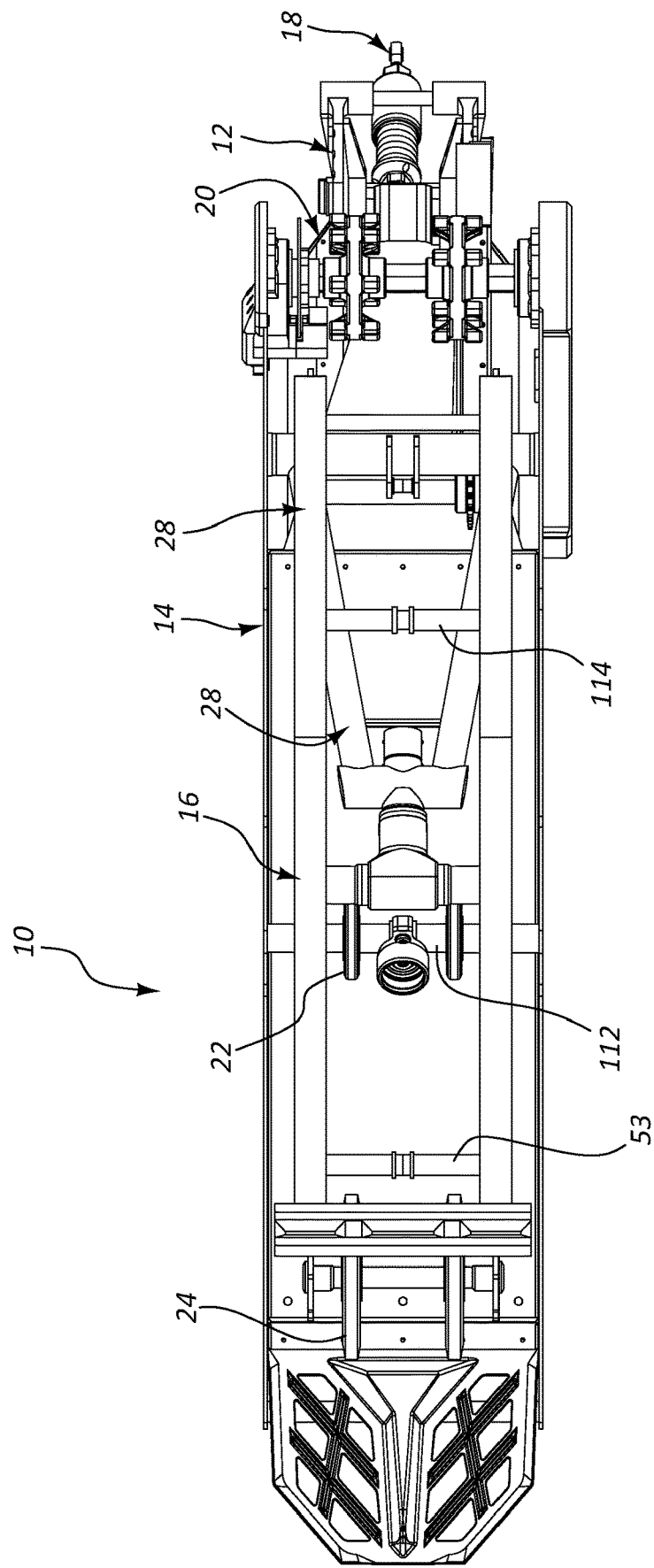
FIG. 6 is a bottom view of the track assembly shown in FIG. 1.
Figure 7:
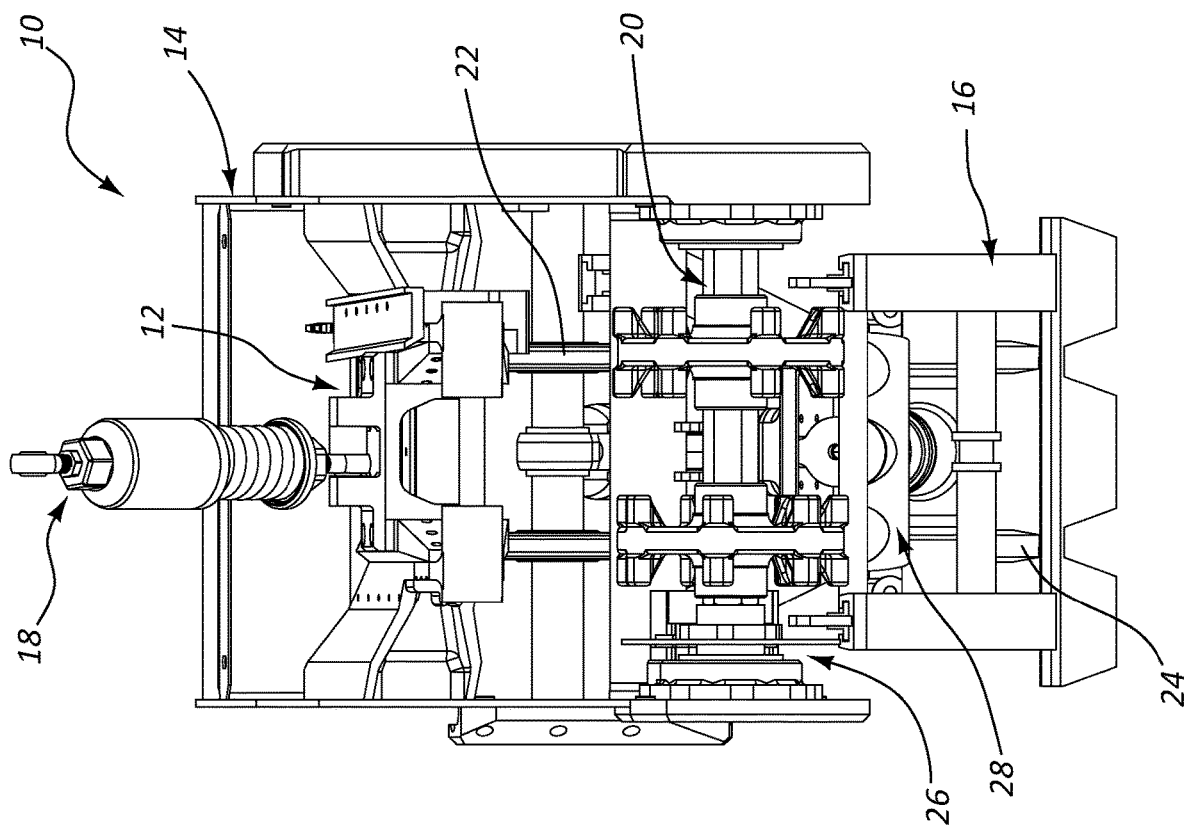
FIG. 7 is a front view of the track assembly shown in FIG. 1.

The bump stop 45 is positioned along a top and/or upper surface of the first and second skid rails 44, 46 as shown in at least FIG. 3. In some embodiments, the bump stop 45 is integrally formed as a single piece with one or more of the first and second skill rails 44, 46. The bump stop is sized and arranged to contact an upper shaft 23 when the shock strut 116 is fully compressed or is nearly fully compressed (i.e., bottoms out or close to bottoming out). The upper shaft 23 supports the upper rollers 22. A bumper or other dampening member may be positioned on the upper shaft 23 in alignment with the bump stop 45 to provide a shock absorbing interface between the upper shaft 23 and bump stop 45. In other embodiments, the bumper or other dampening member may be positioned on the bump stop 45, or on both of the bump stop 45 and upper shaft 23. In still further embodiments, the bump stop 45 may have elastic or flexibility properties that provide deflection or compression of the bump stop 45 when it contacts the upper shaft 23. Contact between the bump stop 45 and upper shaft 23 may limit potential damage to the shock strut 116 that may otherwise occur if the shock strut 116 bottoms out during use.

Since the first and second skid rails 44, 46 rotate toward and away from the frame assembly The bump stop 45 may limit rotation of the first and second skid rails 44, 46 relative to the tunnel 14 (also referred to as a frame or frame assembly). In one example, contact between the bump stop 45 and the upper shaft 23 defines a maximum rotated or compressed position of the first and second skid rails 44, 46 toward the tunnel 14.

The lower rollers 24 are mounted to the first and second skid rails 44, 46 at a rear end portion of the skid rail assembly 16. The lower rollers 24 may have a different shape and size as compared to the upper rollers 22. The endless track 30 may include grooves or guide features along an inner surface thereof that interface with the upper and lower rollers 22, 24. The upper and lower rollers 22, 24 may engage with the endless track 30 in a way that limits lateral movement of the endless track during operation. The lower rollers 24 may be adjustably mounted to the first and second skid rails 44, 46 to permit adjusting a tension force in the endless track 30.

Figure 11:
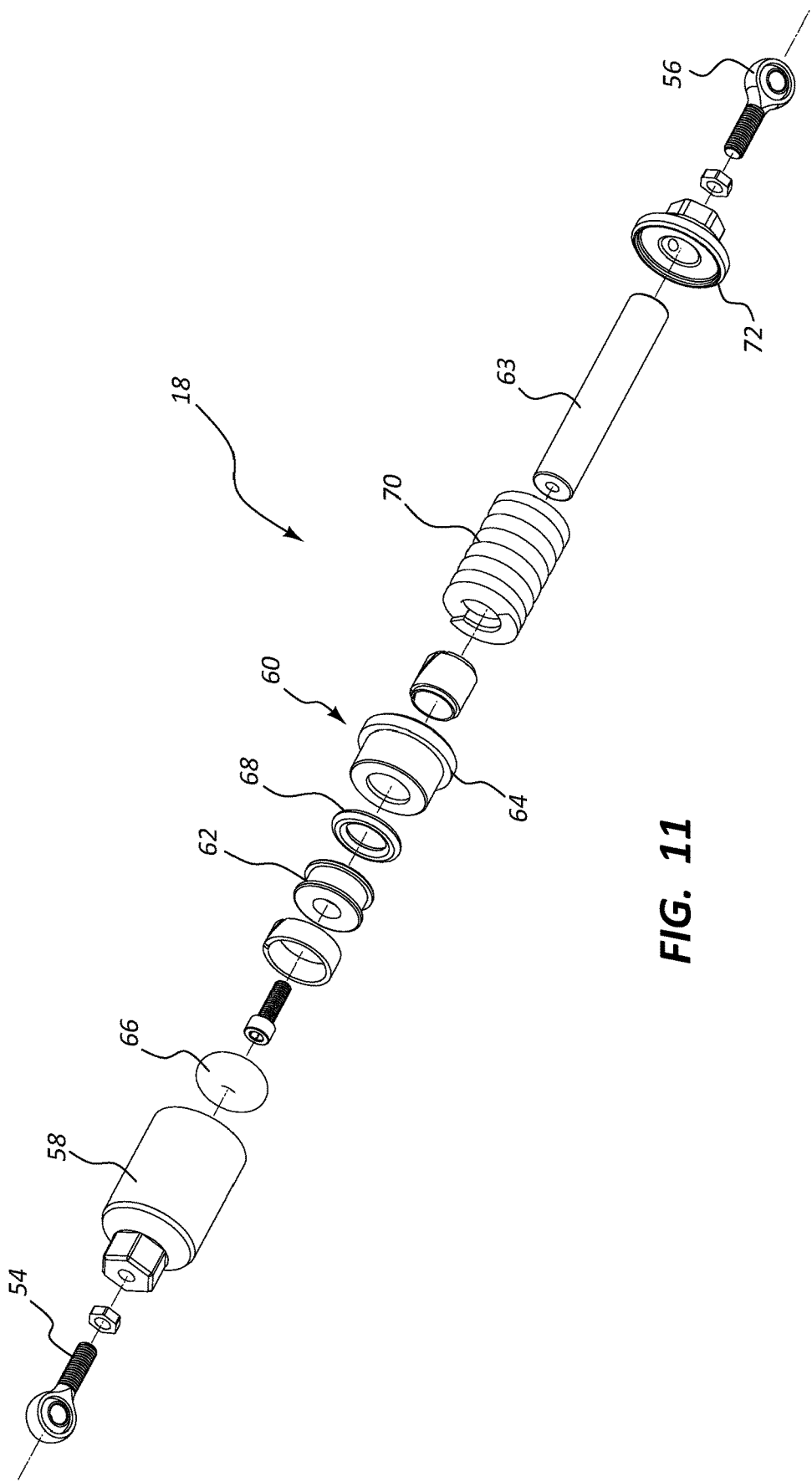
FIG. 11 is an exploded perspective view of a strut of the track assembly shown in FIG. 1.
Figure 12:
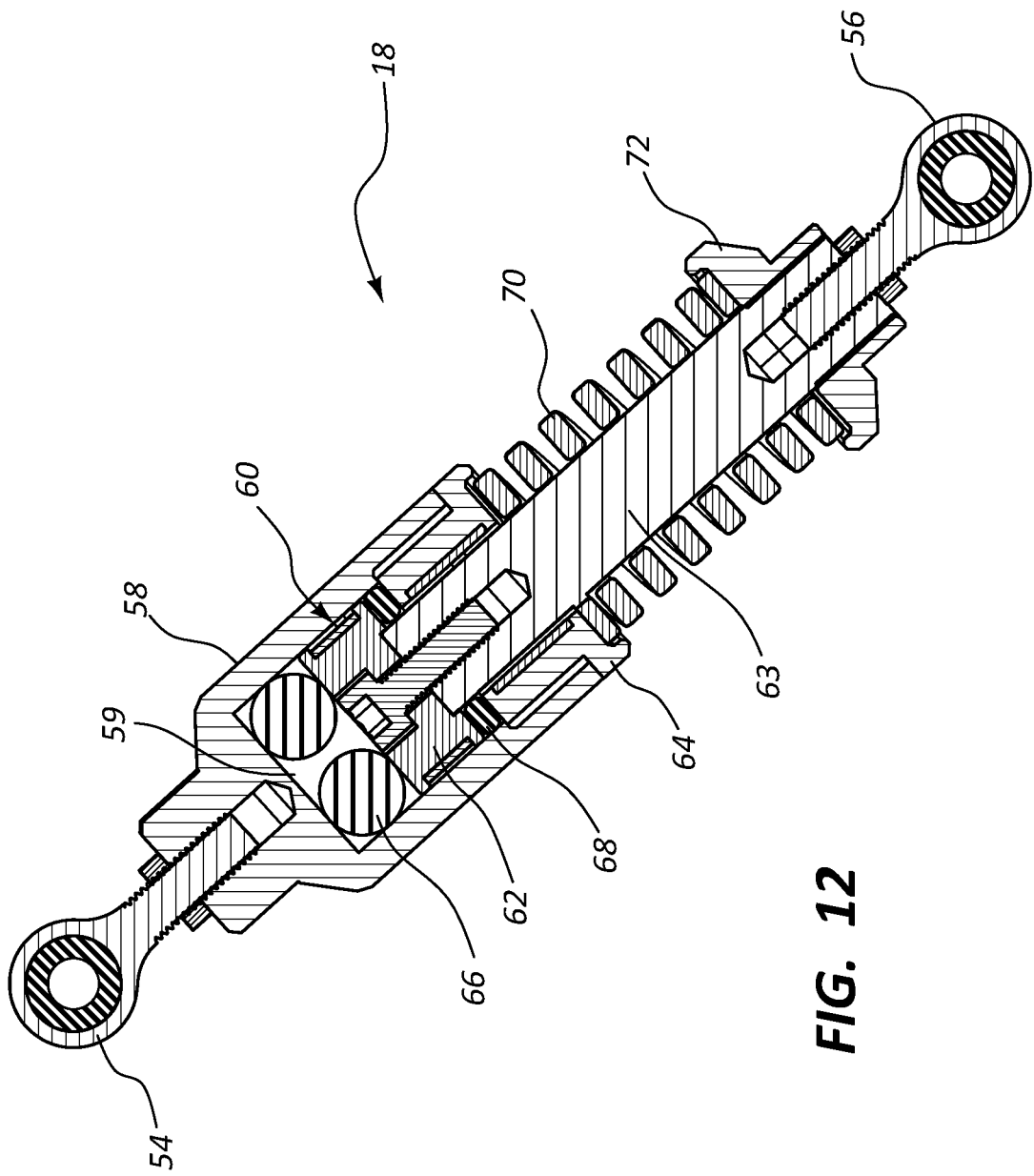
FIG. 12 is a cross-sectional view of the strut shown in FIG. 11.
Figure 13:
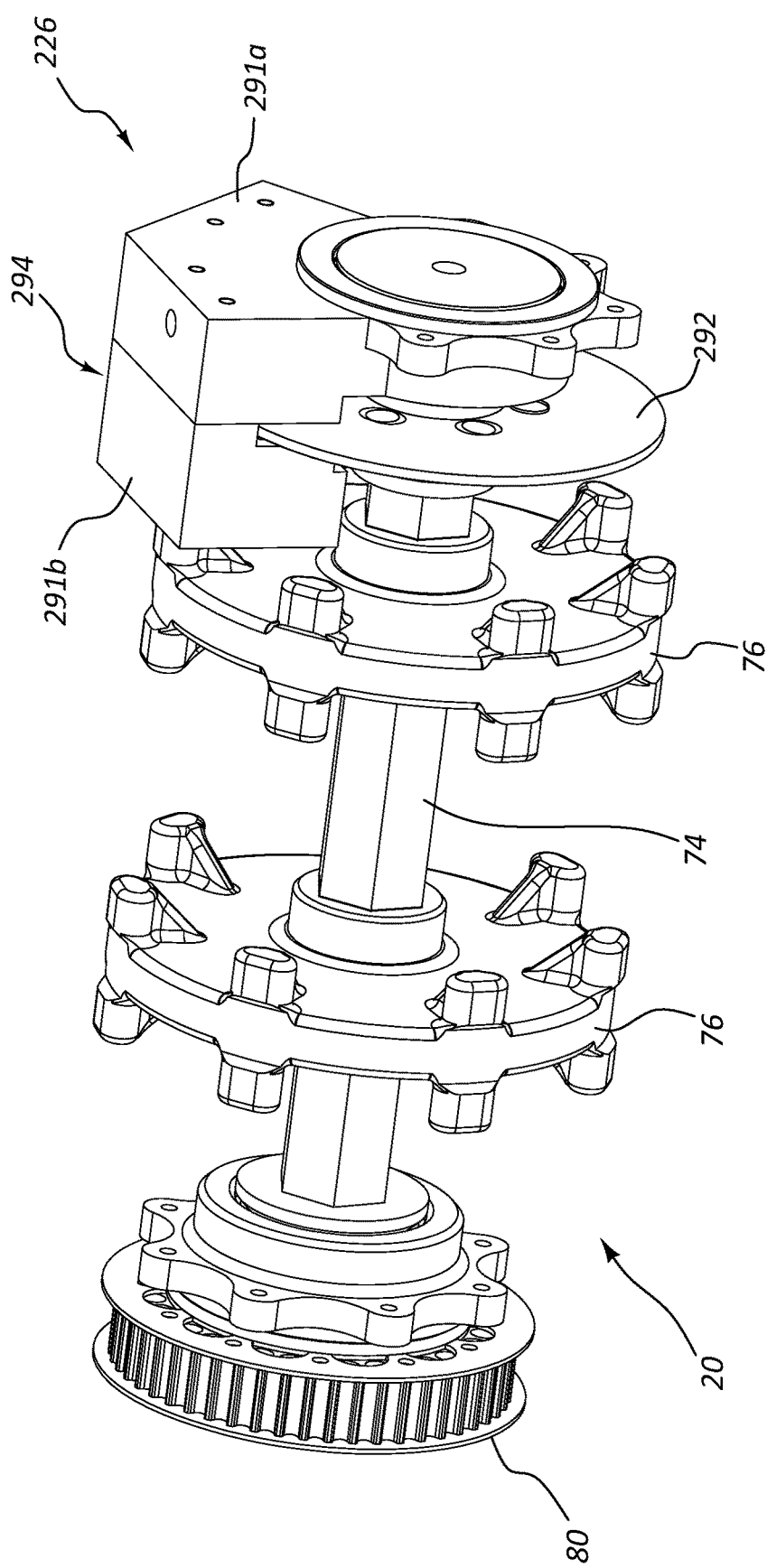
FIG. 13 is a perspective view of an example brake assembly and portion of a drive assembly in accordance with the present disclosure.
Figure 14A:
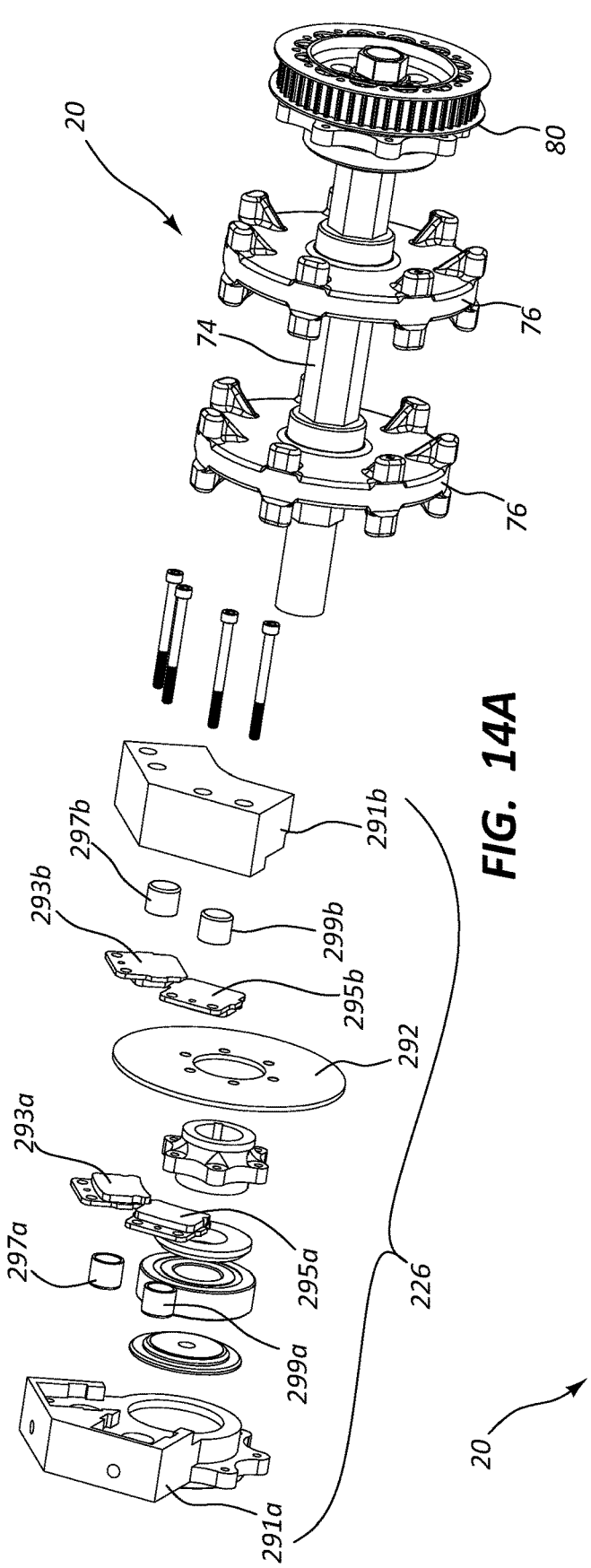
FIGS. 14A and 14B are exploded perspective view of the brake assembly and drive assembly shown in FIG. 13.
Figure 14B:
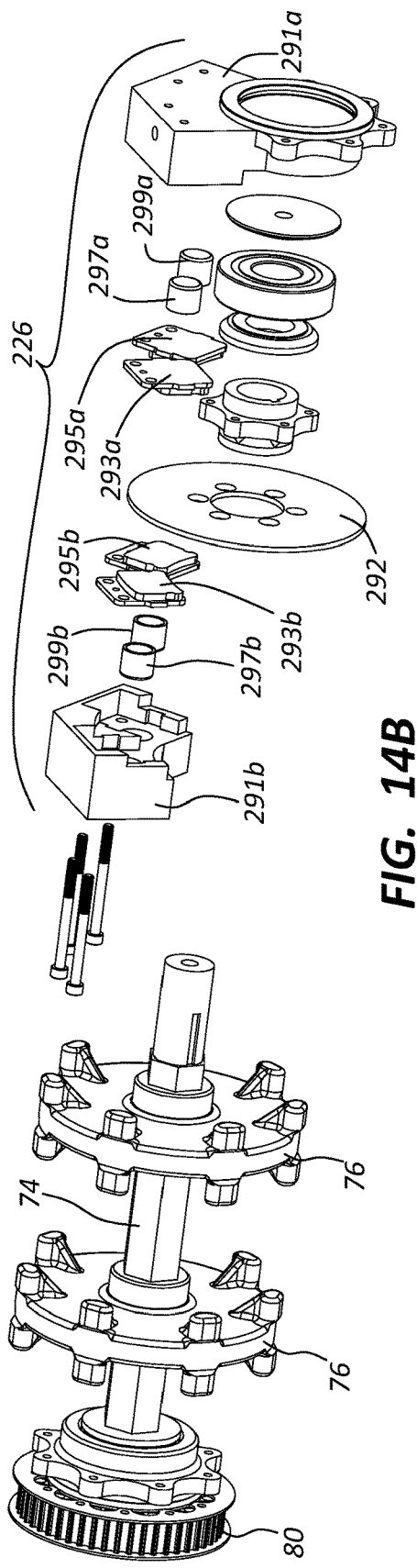
Figures 15A, 15B:
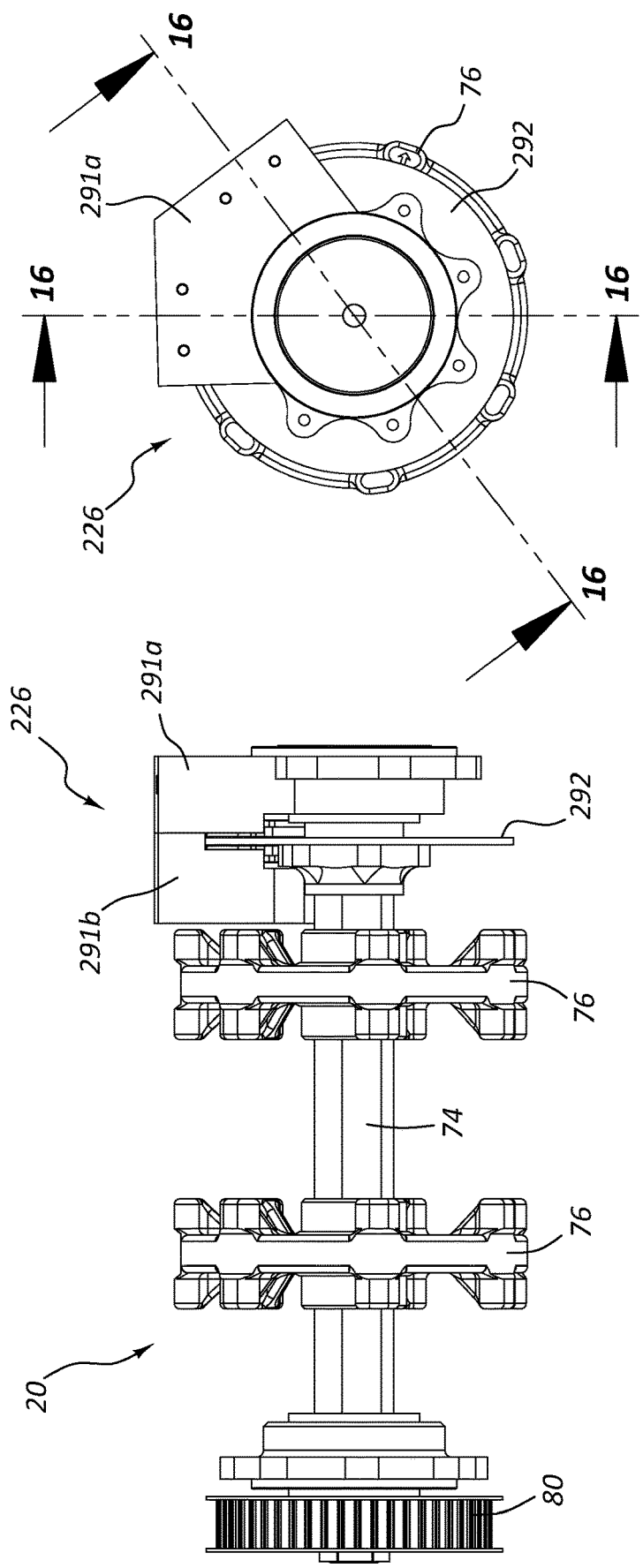
FIGS. 15A and 15B are side and end views, respectively, of the brake assembly and drive assembly shown in FIG. 13.
Figure 16:
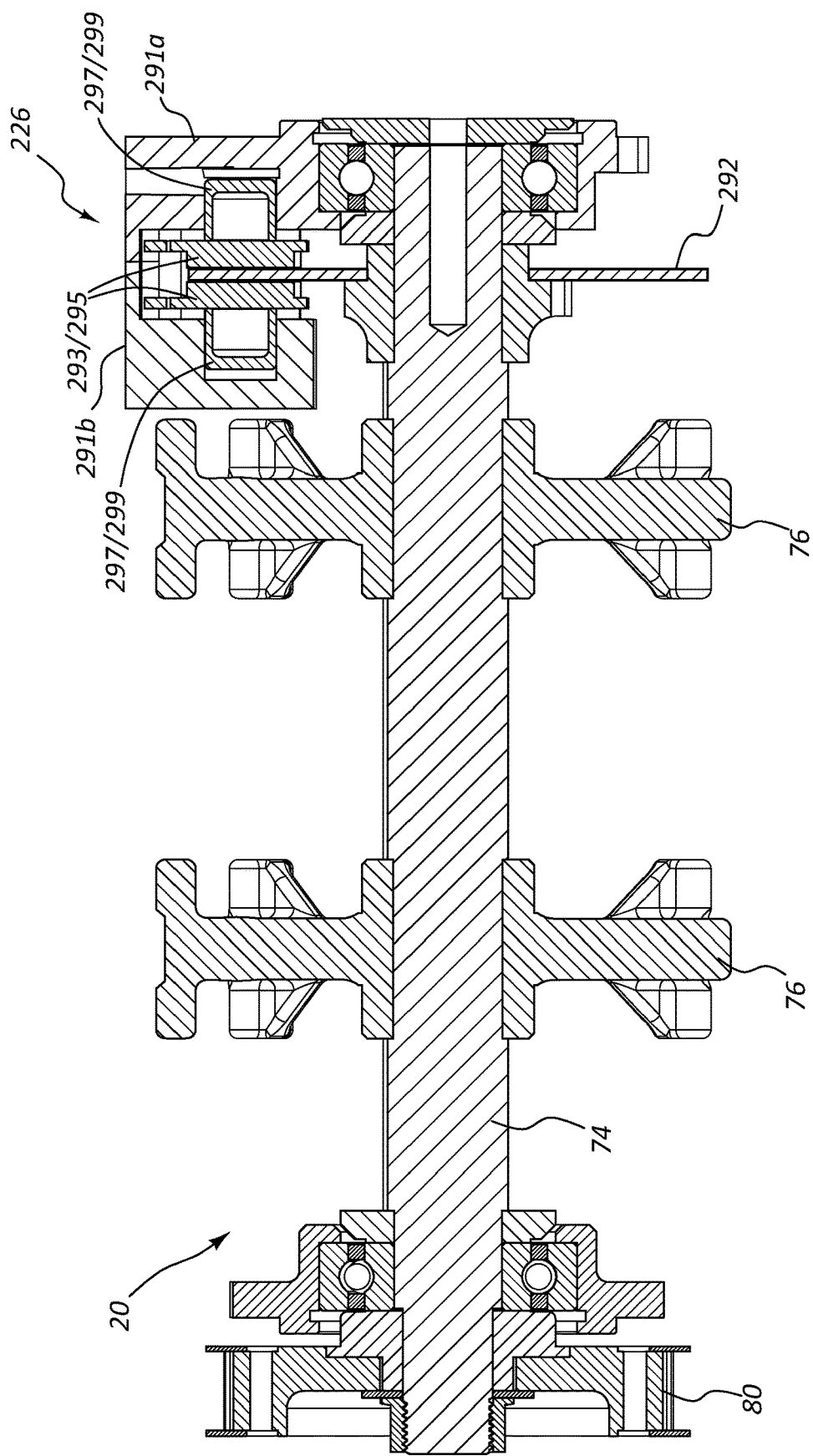
FIG. 16 is a cross-sectional view of the brake assembly and drive assembly shown in FIG. 15B taken along cross-section indicators 16-16.

The shock strut 18 is shown and described in further detail with reference to FIGS. 11 and 12. The shock strut 18 includes first and second connecting members 54, 56 positioned at opposite ends thereof. The first connecting member 54 is configured to attach the shock strut 18 to the rear strut mount 6 of the motorcycle 3, as shown in FIG. 1. The second connecting member 56 is configured to attach the shock strut 18 to subframe 12. The first and second connecting members 54, 56 may be adjustably mounted to other features of shock strut 18, such as with a threaded connection, to adjust, for example, a length of shock strut 18. In other embodiments, either one of the first and second connecting members 54, 56 may be permanently mounted to other features of the shock strut 18 and shock strut 18 may have a fixed length.

Shock strut 18 also includes a cylinder 58 and a piston 60. The cylinder 58 includes an internal chamber 59 within which portions of the piston 60 extend during operation. Piston 60 includes a piston head 62 and a shank 63. Piston head 62 is captured in the chamber 59 between a closed end of the chamber and a cap 64 positioned at the otherwise open end of cylinder 58. The shank 63 extends out of the chamber 59 and has a spring plate 72 mounted at an opposite end thereof. A spring 70 is mounted to shank 63 and retained between the spring plate 72 and the cap 64.

A first dampening member 66 is captured in the chamber 59 between the closed end surface of the chamber 59 and the piston head 62. A second dampening member 68 is positioned between the piston head 62 and the cap 64. The first connecting member 54 is mounted to the cylinder 58. The second connecting member 56 is mounted to the shank 63 of the piston 60. As axial forces are applied at the first and second connecting members 54, 56, the first and second dampening members 66, 68 and spring 70 are expanded/extended and contracted/compressed to provide varying amounts of dampening in shock strut 18. The first and second dampening members 66, 68 and spring 70 may have different sizes, shapes and materials to vary the amount of dampening provided in shock strut 18 at different extended/contracted positions. The sizes, shapes and materials used in the first and second dampening member 66, 68 and spring 70 may be varied to provide different dampening characteristics and thereby different (e.g., customized) amounts of dampening for shock strut 18.

The first and second dampening member 66, 68 may have toroid or O-ring constructions. In other embodiments, at least the first dampening member 66 may have a disc shape rather than a toroid shape. The second dampening member 68 typically includes a central aperture passing there through so that at least a portion of the shank 63 may pass through the second dampening member 68 and into connection with piston head 62. The first and second dampening member 66, 68 may have other structural features such as undulations, accordion-shaped structures, multi-layer construction, and the like to provide different dampening characteristics. In some examples, one or both of the first and second dampening member 66, 68 may include a spring-shaped structure such as a coil spring configured as either a compression spring or an extension spring. The spring 70 may have different shapes, sizes, cross-sectional shapes, and the like. In some examples, spring 70 is exchanged with a solid piece such as a toroid-shaped structure rather than a spring with a plurality of rungs. The shock strut 18 generally provides dampening to give the rider and the machine added protection as well as additional travel for the track assembly 10, for example, when in rough terrain.

The drive assembly 20 includes a drive shaft 74, a plurality of drivers 76, a belt 78 (included under the shown cover), first and second drive pulleys 80, 82, an idler pulley 84 having an eccentric mount 86, an upper drive shaft 88, and an upper drive sprocket 90. A removable cover 83 may help enclose at least the pulleys 80, 82, 84 and belt 78. The drive shaft 74 is mounted to the tunnel 14. The drivers 76 may include features that engage an inner surface of the endless track 30 to transfer torque force from the drive shaft 74 into rotation forces used to rotate the endless track 30.

The drive shaft 74 may be coupled to an auxiliary or upper drive shaft 88 via a secondary drive system that includes the first and second drive pulleys 80, 82 and belt 78 that is coupled between the first and second drive pulleys 80, 82. The upper drive sprocket 90, which is mounted to the upper drive shaft 88, is coupled to a drive output of the engine 9 of motorcycle 3 via the chain 4 shown in FIG. 1.

The idler pulley 84 may be adjusted to change the tension in the belt 78. The eccentric mount 86 may provide a quick and relatively easy way to adjust a position of idler pulley 84 relative to the belt 78. The eccentric mount 86 may include an aperture 87 that is arranged at least partially offset from a central rotation axis of the idler pulley 84. An axle mount 85 extends through the aperture 87. By moving the eccentric mount 86 into different rotated positions about axle mount 85, the idler pulley 84 moves towards and away from the belt 78 to adjust the belt tension. The axle mount 85 may be configured as a bolt that can be tightened to fix a relative rotated position of the eccentric mount 86 to maintain a position of the idler pulley 84 relative to the belt 78. The axle mount 85 may threadably connect to, for example, the tunnel 14. FIG. 2 shows the idler pulley 84 exploded away from the belt 78. FIG. 3 shows the idler pulley 84 mounted to the tunnel 14. The eccentric mount 86 may be rotated until a desired belt tension is achieved, after which the idler pulley 84 and eccentric mount 86 may be secured in place. Backing plates or other mechanisms may attach to the eccentric mount 86 and/or idler pulley 84 to provide stability for the idler pulley 84 thus keeping it in position during operation.

The brake assembly 26 includes a disc 92 and caliper 94 (see FIG. 3). The disc 92 is mounted directly to the drive shaft 74. The caliper 94 may be mounted to, for example, the tunnel 14. The caliper 94 may be operated using, for example, the original brake system of the motorcycle 3. Mounting the disc 92 directly to the drive shaft 74 may provide advantages as compared to other types of brake systems. For example, having the brake on the final drive shaft 74 makes it possible for the brake assembly 26 to provide stopping capability without relying on the drive system. If the belt or chain 4 fails, the brake assembly 26 will still work, providing the ability to stop the snow bike 2. If the brake assembly 26 were mounted on the primary or upper drive shaft 88, the brake assembly 26 would be unable to stop the snow bike 2 in the event of a failure of the belt 78 or chain 4 (or other drive member). Another advantage relates to bringing the center of gravity lower to the ground and closer to the rider, both of which can improve handling of the snow bike 2.

The brake assembly 26 may be controlled from a single master cylinder or multiple master cylinders. The brake assembly 26 may function as a single acting brake assembly using one set of brake pads and one brake disk along with other hardware. FIGS. 13-16 illustrate another example brake assembly 226 that includes multiple sets of brake pads that operate on a single brake disk. In other embodiments, more than two sets of brake pads (and associated pistons/cylinders) may act on a common disk. In still further embodiments, one or more sets of brake pads may be operable on each of two or more brake disks.

The brake assembly 226 is shown in FIGS. 13-16 mounted to a drive shaft 74 of a drive assembly 20. Brake assembly 226 includes a disk 292 and a caliper assembly 294. The caliper assembly 294 includes a caliper housing 291, first and second sets of brake pads 293*a,b*, 295*a,b*, and first and second sets of brake pistons and or cylinders 297*a,b*, 299*a,b*. The brake assembly 226 is controlled by multiple pistons and/or cylinders that include two or more sets of pistons/cylinders and one or more sets of brake pads that act on the same disk. In one arrangement, two or more sets of pistons 297, 299 are controlled from multiple different master cylinders to act on one of the sets of brake pads 293, 295 to provide stopping. In another arrangement, a separate set of brake pads 293, 295 is operated independently by a separate set of pistons and/or cylinders 297, 299.

The multiple sets of brakes provided by brake assembly 226 may be used singularly or in tandem, which may allow the rider to have the option of one or two brakes that are controlled by one or more brake actuators. One brake actuator may be connected to a hand brake of the snow bike 2 and another brake actuator may be connected to a foot brake of the snow bike 2, although may combinations and/or types of brake actuators may be possible for actuating the sets of brakes of brake assembly 226.

Figure 9:
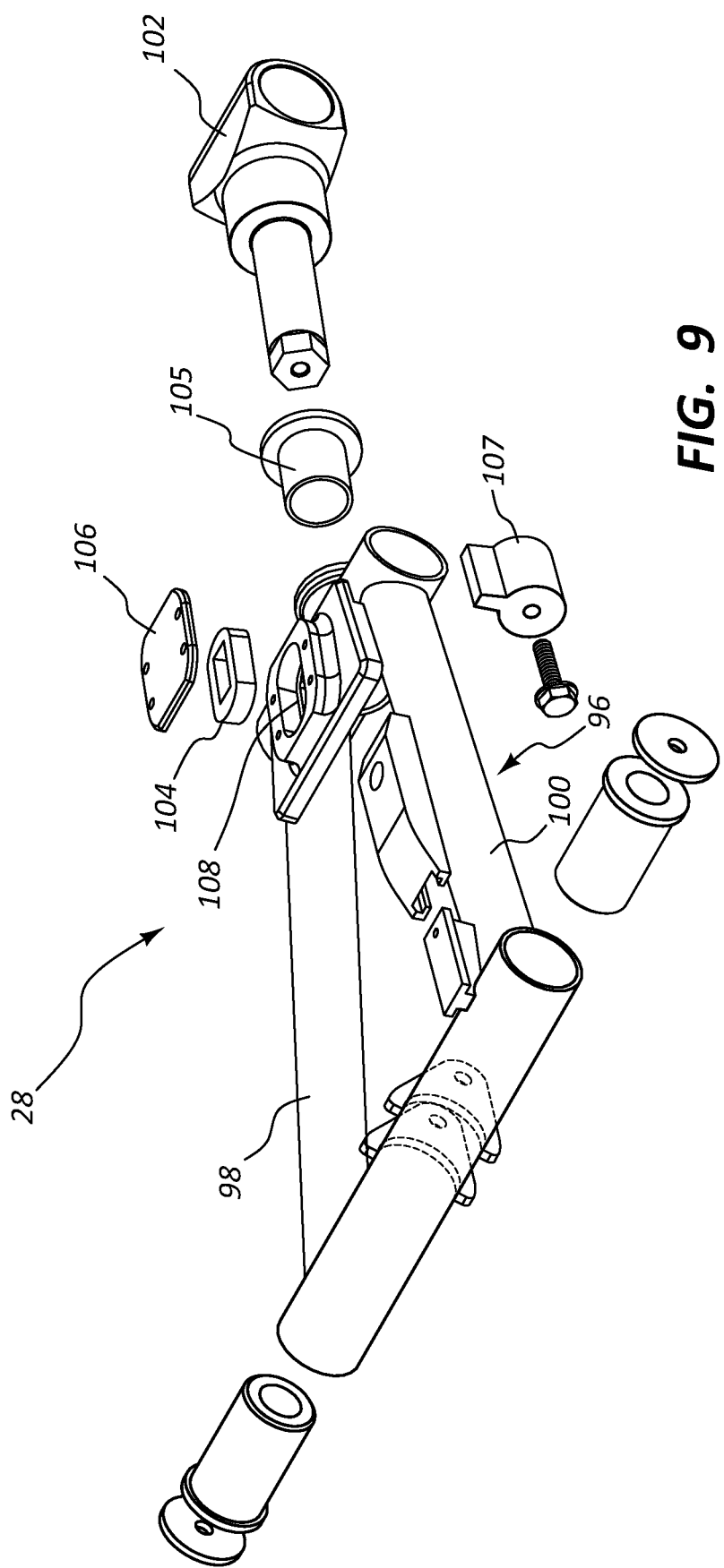
FIG. 9 is an exploded perspective view of a swing arm assembly of the track assembly shown in FIG. 1.
Figure 10:
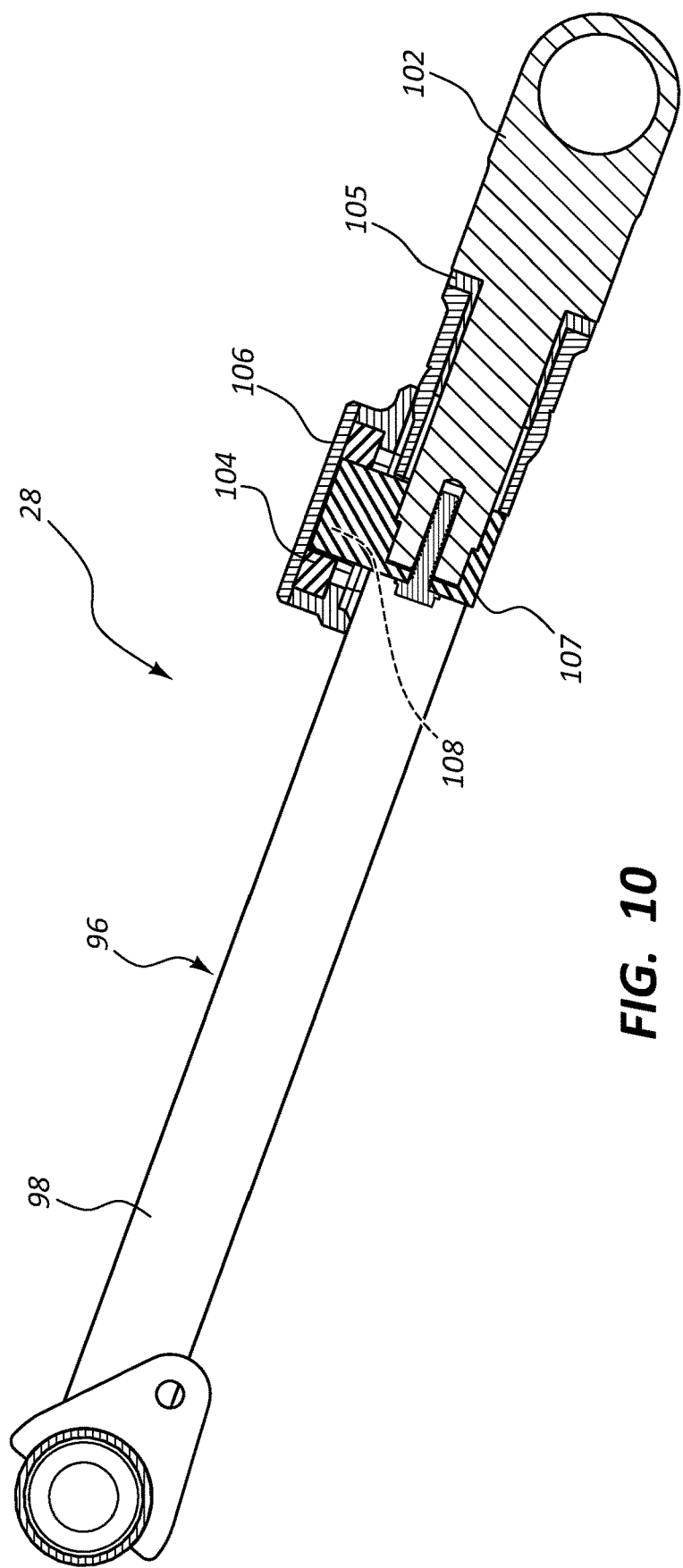
FIG. 10 is a cross-sectional view of the swing arm assembly shown in FIG. 9.

The swing arm assembly 28 is shown and described in further detail in FIGS. 9 and 10. The swing arm assembly 28 includes a swing arm 96 having first and second arm portions 98, 100, a connector 102, a dampening member 104, a bushing 105, a cap 106, an actuator lever 107, and a dampener cavity 108. The dampening member 104 operates between the connector 102 and the swing arm 96. The dampening member 104 may limit and/or dampen relative rotational movement between the swing arm 96 and the connector 102. The dampening member 104 may be at least partially accessible via the dampener cavity 108, which is part of the swing arm 96. A portion of connector 102 is exposed within dampener cavity 108 such that the dampening member 104. The dampening member 104 may interfaces with the connector 102 to provide a rotational dampening function.

The dampening member 104 may be exchanged with other dampening members having different dampening properties. As such, the swing arm assembly 28 may be adjusted to provide customized amounts of dampening. The amount of dampening provided by dampening member 104 may influence the amount of tilting and maneuverability for the track assembly 10. In particular, the dampening member 104 may influence the amount of relative rotational or tilting movement between the frame assembly 13 and the skid rail assembly 16.

In some embodiments, an operator may be able to remove cap 106 to access the dampening member 104. The operator may possess a variety of dampening members that may be specifically designed to provide the type of damping for certain snow, terrain, or other snow bike operating conditions. The operator may switch out the dampening member 104 at different times during operation of the snow bike 2, such as at different times of the year, different times of day, different terrain conditions on a single outing, and the like. The dampening member 104 can be changed out to achieve different ride qualities. For example, a soft durometer dampening member 104 would allow the snow bike 2 to dart more on a trail or rutted surfaces, but the snow bike 2 would turn easier because the skid rail assembly 16 would allow the track assembly 10 to tilt more easily. A firmer durometer dampening member 104 would decrease darting on a trail or in rutted conditions, but a firmer durometer dampening member 104 would make the snow bike 2 more difficult to turn because the skid rail assembly 16 would not tilt with the rider as easily.

The actuator lever 107 includes a portion that contacts the dampening member 104. In some arrangements, a portion of the actuator lever 107 extends into a cavity of dampening member 104 to provide a connection there between, as shown in FIG. 10. The actuator lever 107 may provide transmission of rotational forces from the connector 102 to the dampening member 104, and the dampening member 104 then transmits a portion of the rotational forces to the swing arm 96 (e.g., a portion of rotational forces that are not dissipated by the material of the dampening member 104). The actuator lever 107 may have a rigid construction. In other arrangements, the actuator lever 107 may comprise a dampening material or a portion having dampening properties. The actuator lever 107 may be replaceable with other actuator levers 107 or other connecting features that have different force transmission properties. In still further embodiments, the actuator lever 107 may be used in the swing arm assembly 28 without the dampening member 104, and the actuator lever 107 may or may not include force dampening properties.

An advantage of using swivel/rotation capability in the swing arm assembly 28 is that doing so may permit the frame assembly 13 to tilt left or right with the motorcycle 3 when leaning into a turn while the skid rail assembly 16 remains relatively parallel with the terrain for a certain duration before the edge of the track comes off the riding surface, thus giving the rider the feel of riding a dirt bike. Further, the track assembly 10 may transition from an upright riding position to a leaned position while maintaining traction and with less effort for the rider. The resultant relatively seamless transition period gives the rider more control over the snow bike 2 in a variety of terrain.

Figure 8:
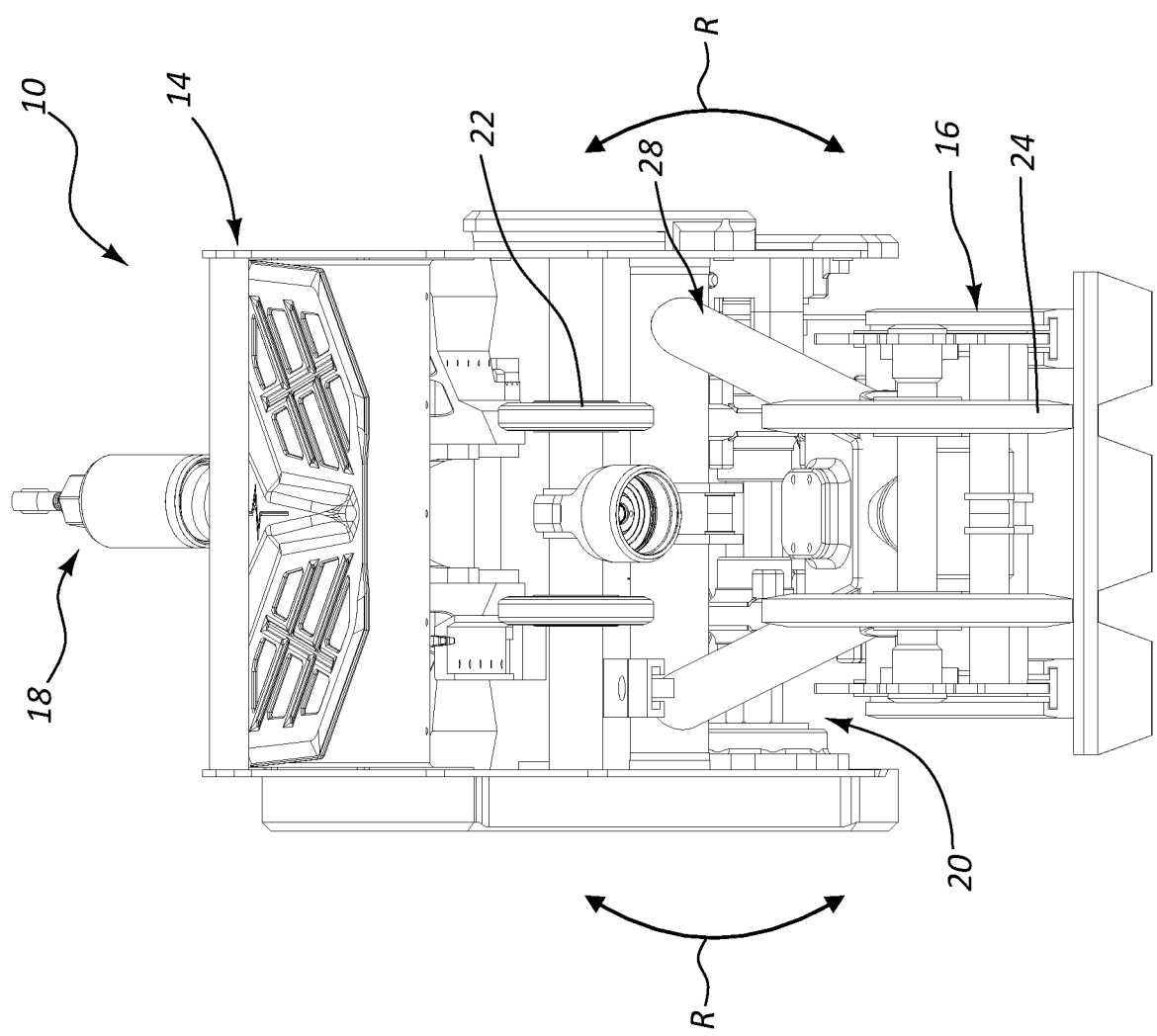
FIG. 8 is a rear view of the track assembly shown in FIG. 1.

The rear view of FIG. 8 shows the rotatability and/or tilting of the skid rail assembly 16 relative to the tunnel 14 by arrow indicators R. This rotatability provides the tilting and maneuverability of the track assembly 10 of snow bike 2 discussed above, which may be influenced by at least the swing arm assembly 28 and its dampening characteristics. Other features may also influence the relative movement between the tunnel 14 and the skid rail assembly 16 including, for example, the shocks 110 and shock strut 116 that extend between the tunnel 14 and the skid rail assembly 16 (see FIG. 1). The shocks 110 and shock strut 116 may be referred to as struts rather than shocks, and may generally be referred to as shock struts. The track assembly 10 may include a plurality of shocks and/or a plurality of struts that are positioned at various locations on the track assembly 10 and provide different functions.

The track assembly 10 provides a number of advantages as compared to known track assemblies for snow bikes. For example, the swing arm 96, which includes first and second arm portions 98, 100, provides improved stability in a lateral direction while also providing adjustable tilting and/or rotation via the rotation connection with connector 102. Further, the swing arm assembly 28 provides rotational damping between the swing arm 96 and connector 102. This rotational dampening may provide improved maneuverability, shock absorption, and the like. Still further, the swing arm assembly 28 includes an adjustable damping feature such that the rotational damping between the swing arm 96 and the connector 102 is adjustable by exchanging the damping member with damping members having different shock absorption and/or damping characteristics.

The shock strut 18 described above may provide advantages as compared to other types of track assemblies wherein the strut is a rigid, fixed length strut. For example, shock strut 18 provides at least some shock absorption. Furthermore, the shock strut 18 includes adjustable shock absorbing features. The shock absorbing features of the shock strut 18 may provide for customized amounts of shock absorption by exchanging the shock absorbing features (e.g., first and second dampening members 66, 68 and/or spring 70). The shock strut 18 also has length adjustment features to provide improves mounting of track assembly 10 to motorcycle 3. The shock strut 18 adjustability also allows the rider to change a seat height by changing the strut length.

The brake assembly of track assembly 10 provides advantages as described above related to responsive, efficient braking of the endless track 30. The brake assembly uses a disc and caliper brake assembly, wherein the disc 92 is mounted directly to the drive shaft 74 that supports the drivers 76 used to drive the endless track 30.

The track assembly 10 also includes an eccentric mount 86 for the idler pulley 84. The eccentric mount 86 may provide quick and efficient adjustment of tension in the drive assembly. An eccentric mount 86 for a tensioner/idler pulley 84 may be used in many other applications outside of track assemblies for snow bikes. Such an eccentric mount 86 for a tensioner/idler pulley 84 can be used in mounting a pulley, roller, gear, or similar rotatable structure. A mount or backing plate for the idler pulley 84 may be movable to allow the idler pulley 84 to move based on a course adjustment and then use the eccentric mount 86 for the fine adjustment.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A snow bike track assembly, comprising:
    a frame assembly configured to connect to a frame of a motorcycle in place of a rear wheel of the motorcycle;
    at least one strut connected to the frame assembly and configured to connect to the motorcycle frame in place of a rear shock of the motorcycle;
    an endless track;
    a plurality of top rollers mounted to the frame assembly and arranged to support the endless track;
    a skid rail assembly;
    a plurality of lower rollers mounted to the skid rail assembly and arranged to support the endless track;
    a drive assembly configured to drive the endless track, the drive assembly being mounted to the frame assembly and configured to be driven by an engine of the motorcycle, the drive assembly including an idler pulley having an eccentric mounting structure;
    a swing arm assembly coupled between the frame assembly and the skid rail assembly, the swing arm assembly comprising:
        a swing arm member connected to the frame assembly;
        a connector connected to the skid rail assembly;
        a dampening member interposed between the swing arm member and the connector and operable to dampen relative rotation between the swing arm member and the connector.

2. The snow bike track assembly of claim 1, wherein the swing arm member is pivotally connected to the frame assembly.

3. The snow bike track assembly of claim 2, wherein the connector is pivotally connected to the skid rail assembly.

4. The snow bike track assembly of claim 2, wherein the swing arm member includes first and second arm portions that are laterally spaced apart from each other.

5. The snow bike track assembly of claim 1, wherein the frame assembly includes a subframe assembly and a tunnel assembly, the subframe assembly being configured to connect to the motorcycle frame, the plurality of top rollers being mounted to the tunnel assembly, and the swing arm member being connected to the tunnel assembly.

6. The snow bike track assembly of claim 1, wherein the drive assembly includes a drive shaft and at least one drive member mounted to the drive shaft, the at least one drive member being arranged in contact with and configured to move the endless track.

7. The snow bike track assembly of claim 6, further comprising a shock strut interposed between the skid rail assembly and the frame assembly, the shock strut being positioned rearward of the swing arm assembly.

8. The snow bike track assembly of claim 1, wherein the dampening member is adjustable or replaceable to vary an amount of dampening applied by the dampening member between the swing arm member and connector.

9. The snow bike track assembly of claim 1, wherein the at least one strut includes at least one shock absorbing member.

10. A snow bike track assembly, comprising:
    a frame assembly configured to connect to a frame of a motorcycle in place of a rear wheel of the motorcycle;
    an endless track;

a plurality of top rollers mounted to the frame assembly and arranged to support the endless track;

a skid rail assembly;

at least one stop member mounted to the skid rail assembly and configured to limit maximum rotational movement of the skid rail assembly toward the frame assembly;

a plurality of lower rollers mounted to the skid rail assembly and arranged to support the endless track;

an upper shaft mounted to the frame assembly and configured to support the plurality of top rollers, and the at least one stop member contacts the upper shaft at maximum rotated position for the skid rail assembly relative to the frame assembly.

11. The snow bike track assembly of claim 10, further comprising at least one strut connected to the frame assembly and configured to connect to the motorcycle frame in place of a rear shock of the motorcycle.

12. The snow bike track assembly of claim 11, wherein the at least one stop member is integrally formed with the skid rail assembly.

* * * * *